Nov. 9, 1954 M. S. BIELAWSKI ET AL 2,694,048
MANUFACTURE OF IMPROVED SOLID CATALYSTS
Filed March 18, 1950 2 Sheets-Sheet 1

FIG. 1

POLYMERIZATION ACTIVITY OF CATALYSTS
PRODUCED FROM POLYPHOSPHORIC ACID, WOOD CHARCOAL, AND
DIATOMACEOUS EARTH.

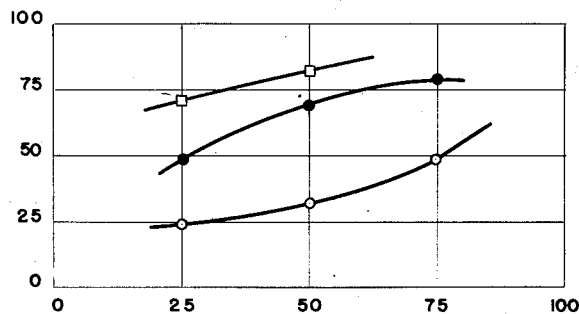

CALCINATION: 1 HOUR AT 860° F.

% WOOD CHARCOAL IN MIXTURE
OF IT AND DIATOMACEOUS EARTH.

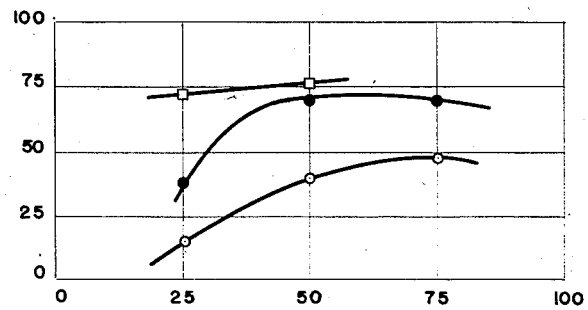

CALCINATION: 1 HOUR AT 950° F.

% WOOD CHARCOAL IN MIXTURE
OF IT AND DIATOMACEOUS EARTH.

ACTIVITY AS PERCENT CONVERSION OF PROPYLENE.

LEGEND:

○ — 60% POLYPHOSPHORIC ACID.
● — 70% POLYPHOSPHORIC ACID.
□ — 80% POLYPHOSPHORIC ACID.

INVENTORS.
MITCHELL S. BIELAWSKI
JULIAN M. MAVITY

BY: *Chester J. Giuliani*
ATTORNEY
*Raymond E. Schaad*
AGENT.

FIG. 2
CRUSHING STRENGTH OF CATALYSTS
PRODUCED FROM POLYPHOSPHORIC ACID, WOOD CHARCOAL, AND
DIATOMACEOUS EARTH.
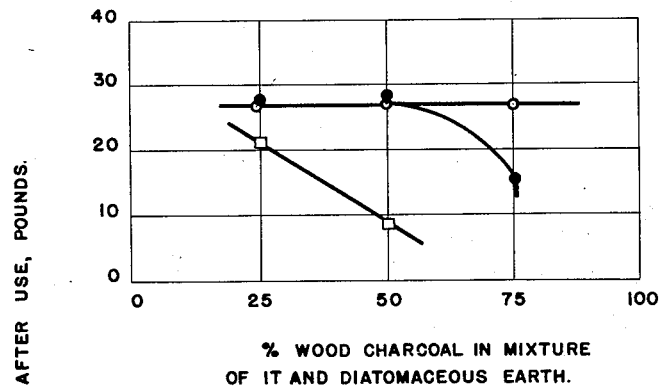
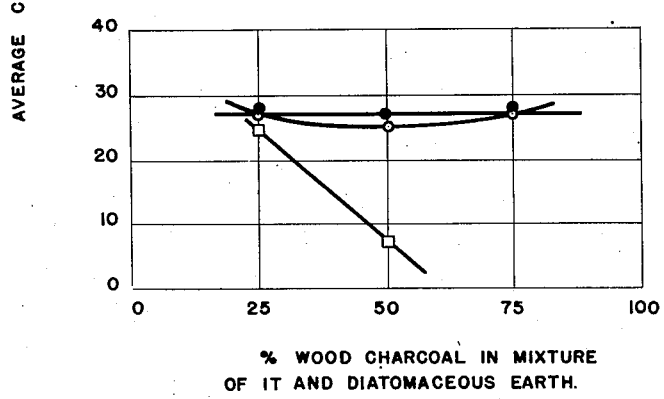
LEGEND:
○ — 60% POLYPHOSPHORIC ACID.
● — 70% POLYPHOSPHORIC ACID.
□ — 80% POLYPHOSPHORIC ACID.
INVENTORS.
MITCHELL S. BIELAWSKI
JULIAN M. MAVITY

United States Patent Office 2,694,048
Patented Nov. 9, 1954

2,694,048

MANUFACTURE OF IMPROVED SOLID CATALYSTS

Mitchell S. Bielawski, Berwyn, and Julian M. Mavity, Hinsdale, Ill., assignors to Universal Oil Products Company, Chicago, Ill., a corporation of Delaware Application March 18, 1950, Serial No. 150,404

19 Claims. (Cl. 252—435)

This invention relates to the manufacture of improved solid catalysts useful in accelerating various types of reactions among organic compounds particularly unsaturated organic compounds. In a more specific sense, the invention is concerned with the production of a particular type of solid catalyst which has specific properties both in regard to its activity in accelerating and directing olefin conversion reactions, particularly polymerization, its stability in service, and in its relatively low corrosive properties when employed in ordinary commercial apparatus, comprising various types of steel.

An object of this invention is a method of producing a hydrocarbon conversion catalyst which has a high resistance to crushing during use.

Another object of this invention is a highly active catalyst suitable for use in the polymerization of olefinic hydrocarbons and in other hydrocarbon conversion reactions involving olefins.

A further object of this invention is a method of producing a solid hydrocarbon conversion catalyst having high structural strength and also high activity for converting olefins into normally liquid polymers.

Heretofore catalysts useful for promoting conversion reactions of olefinic hydrocarbons such as polymerization have been produced by coating wood charcoal and various activated charcoals with liquid phosphoric acid to form a substantially solid material. Other solid catalysts of similar structure have also been produced by compositing an oxygen acid of phosphorus with a substantially siliceous adsorbent such as diatomaceous earth, fuller's earth, montmorillonite, and the like, and adding to such a composite from about 1 to about 5 per cent by weight of an organic material such as wood flour, sawdust, etc. which would carbonize during calcination of the catalyst and the resultant carbonaceous material would act as a binder for the catalyst particles. The aforementioned catalytic materials have certain shortcomings, that is, the charcoal coated with a large amount of phosphoric acid remains sticky during use and accordingly is highly corrosive to metal equipment, whereas the substantially siliceous carrier when admixed with phosphoric acid and small amounts of wood flour and the like, yields a catalytic material which has relatively low structural strength and accordingly suffers considerable pulverization during polymerization use.

We have found that catalysts may be produced with unexpectedly improved structural strength by compositing an oxygen acid of phosphorus with a powdered solid carrier consisting of from about 25 to about 75 per cent by weight of a siliceous adsorbent and from about 75 to about 25 per cent by weight of a solid carbonaceous material selected from the members of the group consisting of lampblack, graphite, charcoal, powdered coke and powdered coal. Composites so formed from an oxygen acid of phosphorus and a mixture of a siliceous adsorbent and a powdered carbonaceous material are calcined at temperatures which we have found suitable for producing solid particles with relatively high structural strength and activity for hydrocarbon conversion.

One embodiment of this invention relates to a process for manufacturing an improved solid catalyst which comprises mixing from about 60 to about 80 per cent by weight of an oxygen acid of phosphorus with from about 40 to about 20 per cent by weight of a solid carrier consisting of from about 1 to about 3 parts by weight of diatomaceous earth and from about 3 to about 1 part by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

Another embodiment of this invention relates to a process for manufacturing a solid catalyst which comprises mixing from about 65 to about 75 per cent by weight of an oxygen acid of phosphorus with from about 35 to about 25 per cent by weight of a solid carrier consisting of from about 1 to about 3 parts by weight of diatomaceous earth and from about 3 to about 1 part by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

A further embodiment of this invention relates to a process for manufacturing a solid catalyst which comprises mixing from about 65 to about 75 per cent by weight of a polyphosphoric acid with from about 35 to about 25 per cent by weight of a solid carrier consisting of from about 1 to about 3 parts by weight of diatomaceous earth and from about 3 to about 1 part by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

The essential and active ingredient of the solid catalysts which are manufactured by the present process for use in organic reactions is an acid of phosphorus, preferably one in which the phosphorus has a valence of 5. Of the various acids of phosphorus, orthophosphoric acid ($H_3PO_4$) and pyrophosphoric acid ($H_4P_2O_7$) find general application in the primary mixtures, due mainly to their cheapness and to the readiness with which they may be procured although the invention is not restricted to their use but may employ any of the other acids of phosphorus insofar as they are adaptable. It is not intended to infer, however, that the different acids of phosphorus, which may be employed will produce catalysts which have identical effects upon any given organic reactions as each of the catalysts produced from different acids and by slightly varied procedure will exert its own characteristic action.

In using orthophosphoric acid as a primary ingredient, different concentrations of the aqueous solution may be employed from approximately 75 to 100 per cent or acid containing some free phosphorus pentoxide may even be used. By this is meant that the ortho acid may contain a definite percentage of the pyro acid corresponding to the primary phase of dehydration of the orthophosphoric acid. Within these concentration ranges, the acids will be liquids of varying viscosities, and readily mixed with adsorbent materials. We have found that pyrophosphoric acid corresponding to the formula $H_4P_2O_7$ can be incorporated with siliceous and carbonaceous carriers at temperatures somewhat above its melting point (142° F.) and that the period of heating which is given to the mixtures or to mixtures of other polyphosphoric acids and these carriers may be different from that used when the ortho acid is so employed.

Triphosphoric acid which may be represented by the formula $H_5P_3O_{10}$ may also be used as a starting material for preparation of the catalysts of this invention. These catalytic compositions may also be prepared from the siliceous and carbonaceous materials mentioned herein and phosphoric acid mixture containing orthophosphoric, pyrophosphoric, triphosphoric, and other polyphosphoric acids.

Another acid of phosphorus which may be employed in the manufacture of composite catalysts according to the present invention is tetraphosphoric acid. It has the general formula $H_6P_4O_{13}$ which corresponds to the double oxide formula $3H_2O \cdot 2P_2O_5$ which in turn may be considered as the acid resulting when three molecules of water are lost by four molecules of orthophosphoric acid $H_3PO_4$. The tetraphosphoric acid may be manufactured by the gradual and controlled dehydration by heating of orthophosphoric acid or pyrophosphoric acid or by adding phosphorus pentoxide to these acids in proper amounts. When the latter procedure is followed, phosphoric anhydride is added gradually until it amounts to 520 per cent of the total water present. After a considerable period of standing at ordinary temperatures, the crystals of the tetraphosphoric acid separate from the viscous liquid and it is found that these crystals melt at approximately 93° F. and have a specific gravity of 1.1886, at a temperature of 60° F. However, it is unnecessary to crystallize the tetraphosphoric acid before employing it in the preparation of the solid catalyst inasmuch as the crude tetraphosphoric acid mixture may be incorporated with the siliceous and carbonaceous carriers.

The solid siliceous adsorbents which are used as carriers together with the mentioned carbonaceous materials include diatomaceous earth, kieselguhr, and artificially prepared porous silica, as well as certain members of the class of aluminum silicates such as naturally occurring clays as bentonite, montmorillonite, acid-treated clays, also various fuller's earths. These may be used individually with the carbonaceous carrier or combinations of them may be used with the carbonaceous carrier.

The solid carbonaceous materials which serve as supporting materials together with siliceous adsorbents for phosphoric acid to produce solid catalysts include lampblack, graphite, coke, coal, charcoal, and the like. The coke that is usable in these mixtures may be either that produced from coal such as metallurgical coke, or it may be coke produced from petroleum and petroleum residues and generally known as petroleum coke. The coal which is utilizable in these catalyst mixtures is preferably soft coal that has been ground to a relatively fine powder. Wood charcoal is also pulverized so that it is readily incorporated with phosphoric acid and the diatomaceous earth or other siliceous carrier used in forming the catalyst composite.

The preferred range of ratio of carbon or carbonaceous material to diatomaceous earth or other siliceous adsorbent is about 0.33 to about 3 which corresponds to about 25 to about 75 per cent of carbon or carbonaceous material and from about 75 to about 25 per cent by weight of the siliceous adsorbent. When the carbonaceous material is below the 25 per cent value, the catalysts are more sensitive to high temperature calcination as manifested by lower olefin polymerizing activity after such treatment. Also if the carbonaceous material employed is higher than about 75 per cent by weight of the total solid carrier, then the resultant mixtures with phosphoric acid are too soft for extrusion and cannot be hardened by low temperature heating, such as at 340° F. and therefore such composites cannot be handled and subjected to the higher temperature calcination at a temperature of 850° to about 1200° F. When calcination temperatures lower than about 850° F. are employed, the crushing strengths of the resultant catalysts are undesirably low, particularly in the case of those catalysts which have the higher content of phosphoric acid. At excessively high calcination temperatures, the activity of the catalyst composite is impaired.

The phosphoric acid content of these catalyst composites is from about 60 per cent to about 80 per cent by weight. The preferred composites contain from about 65 to about 75 per cent by weight of the oxygen acid of phosphorus composited with the solid carrier. Catalysts of lower acid content than the mentioned 60 per cent suffer from the activity standpoint while those with too high a content of phosphoric acid have poor structural strength both during calcination and subsequent use for olefin conversions such as polymerization.

Solid catalysts may be prepared from an oxygen acid of phosphorus, such as orthophosphoric acid, pyrophosphoric acid, triphosphoric acid, or tetraphosphoric acid and a mixture of a siliceous adsorbent and a carbonaceous material. These three ingredients may be mixed simultaneously or the dry powdered carriers may first be commingled and then the commingled mixture may be composited with the phosphoric acid which is preferably heated to facilitate the mixing operation. This mixing is carried out at a temperature of from about 50° to about 450° F. to form an aggregate, the acid being in major proportion by weight. Thus quite satisfactory results have been obtained by heating the polyphosphoric acid to a temperature of about 340° F. (170° C.) and then mixing the hot phosphoric acid with the mixture of diatomaceous earth and carbonaceous material which has previously been at room temperature. The composite of phosphoric acid, siliceous adsorbent, and carbonaceous material, is a moist composite which in most cases must be heated at a temperature of 340° F. (170° C.) for 15 to 30 minutes and in extreme cases as long as two to three hours before it becomes dry enough for extrusion. The resultant partially dried composite which is slightly moist to almost dry in appearance becomes plastic when subjected to pressure in a hydraulic press-type extruder by which it is formed into pieces that are cut into shaped particles. In order to effect such extrusion, it is often necessary to compress the composite at a pressure of from about 2,000 to 20,000 pounds per square inch or more. The resultant composite while it is still hot, is extruded through a die preheated to a temperature of about 340° F. These extruded particles of catalyst are then dried at a temperature of about 340° F. after which the solid pieces are calcined further at a temperature of from about 850° to about 1200° F. The calcination treatment referred to above is generally carried out for a time of from about 0.25 to about 10 hours to form a substantially solid granular material. The calcining may be carried out by heating the catalyst particles in a substantially inert gas, such as air, nitrogen, and the like.

The resultant catalyst which has been calcined is active for promoting polymerization of olefinic hydrocarbons particularly for polymerizing normally gaseous olefinic hydrocarbons to form normally liquid hydrocarbons suitable for use as constituents of gasoline. When employed in the conversion of olefinic hydrocarbons into polymers, the calcined catalyst formed as herein set forth, is preferably employed as a grandular layer in a heated reactor, which is generally made from steel, and through which the preheated hydrocarbon fraction is directed. Thus the solid catalyst of this process may be employed for treating mixtures of olefin-containing hydrocarbon vapors to effect olefin polymerization, but this same catalyst may also be used at operating conditions, suitable for maintaining liquid phase operation during polymerization of olefinic hydrocarbons, such as butylenes, to produce gasoline fractions. Thus when employed in the polymerization of normally gaseous olefins, the formed and calcined catalyst particles are generally placed in a vertical, cylindrical tower and the olefin-containing gas mixture is passed downwardly therethrough at a temperature of from about 350° to about 550° F. and at a pressure of 100 to about 1500 pounds per square inch when dealing with olefin-containing materials such as stabilizer reflux which may contain from approximately 10 to 50% or more of propylene and butylene. When operating on a mixture comprising essentially butanes and butylenes, this catalyst is effective at conditions favoring the maximum utilization of both normal butylenes and isobutylene which involves mixed polymerization at temperatures of from approximately 250° to about 325° F. and at pressures of from about 500 to about 1500 pounds per square inch.

When the catalysts of this invention are utilized for promoting miscellaneous organic reactions, the catalysts may be employed in essentially the same way as they are used when polymerizing olefins, in case the reactions are essentially vapor phase, and they also may be employed in suspension in liquid phase in various types of equipment.

With suitable modifications in the details of operation, the present type of catalyst may be employed in a large number of organic reactions including polymerization of olefins as already mentioned. Typical cases of reactions in which the present type of catalyst may be used are the alkylation of cyclic compounds with olefins, the cyclic compounds including aromatics, polycyclic compounds, naphthenes, and phenols; condensation reactions such as those occurring between ethers and aromatics, alcohols and aromatics, phenols and aldehydes, etc.; reactions involving the hydro-halogenation of unsaturated organic compounds, isomerization reactions, ester formation by the interaction of carboxylic acids and olefins, and the like. The specific procedure for utilizing the present type of catalysts in miscellaneous organic reactions will be determined by the chemical and physical characteristics and the phase of the reacting constituents.

During use of these catalysts in vapor phase polymerizations and other vapor phase treatments of organic compounds, it is often advisable to add small amounts of moisture to prevent excessive dehydration and subsequent decrease in catalyst activities. In order to substantially prevent loss of water from the catalyst an amount of water or water vapor such as steam is added to the charged olefin-containing gas so as to substantially balance the vapor pressure of the catalyst. This amount of water vapor varies from about 0.1 to about 6% by volume of the organic material charged.

Solid phosphoric acid catalysts which have been prepared heretofore by calcining composites of a siliceous adsorbent and a phosphoric acid frequently lose their activties during polymerization use and also suffer a marked decrease in crushing strength due to softening of the catalyst. Such softening of the catalyst also results in short catalyst life inasmuch as the catalyst towers become plugged during use.

Also composites consisting only of polyphosphoric acid and any one of the aforementioned carbonaceous materials remained plastic and moist and did not yield satisfactory solid catalytic material. The 60 to 80% polyphosphoric acid content of the catalysts of this invention is higher than the amount of polyphosphoric acid that is readily supported by carbon carriers. Also, such composites do not harden satisfactorily either to permit extrusion or during the final calcination treatment, although carbonaceous catalysts of high phosphoric acid contents are producible by calcining a mixture of phosphoric acid and wood flour or other finely divided carbonaceous material of vegetable origin capable of undergoing carbonization during calcination. In the process of our invention, catalysts of high crushing strengths are produced by using as a carrier a composite of a siliceous adsorbent and a carbonaceous material as hereinabove set forth, said mixture of from about 25 to about 75 per cent by weight of a siliceous adsorbent and from about 75 to about 25 per cent by weight of the finely divided carbonaceous material being highly superior to either of the two components, that is, the siliceous adsorbent or carbonaceous material when used separately as a carrier for phosphoric acid. Thus, the catalysts formed from the mixed carrier and phosphoric acid have unexpectedly higher crushing strengths both before and after use in hydrocarbon conversion reactions and these catalysts also have higher activities than similar catalyst composites produced from phosphoric acid and the individual carriers. The activities of these catalysts for converting olefins have been tested in rotatable steel auto-claves in which it has also been found that such catalysts have retained a high crushing strength after such polymerization use in which from about 25 to about 92 per cent of the propylene charged is converted into liquid products.

Accordingly, in this process, highly active and structurally strong catalysts are produced by mixing from about 60 to about 80 per cent by wieght of an oxygen acid of phosphorus with from about 5 to about 30 per cent by weight of a siliceous adsorbent and from about 30 to about 5 per cent by weight of a carbonaceous material selected from the members of the group consisting of lampblack, carbon black, graphite, charcoal, coke, and powdered coal. Thus a catalyst composite which is formed to contain 60 per cent by weight of a phosphoric acid will also contain from about 10 to about 30 per cent by weight of a siliceous carrier and from about 30 to about 10 per cent by weight of one or more of the mentioned carbonaceous materials, whereas solid catalyst containing a higher proportion of phosphoric acid such as 80 per cent by weight of a polyphosphoric acid will also contain from about 5 to about 15 per cent by weight of a siliceous adsorbent and from about 15 to about 5 per cent by weight of a solid carbonaceous material such as charcoal, powdered coke, powdered coal, and the like. The resultant composite may be heated at a temperature of 340° F. for a time up to several hours in length to bring the composite to a degree of hardness satisfactory for extrusion after which this material is subjected to an extrusion and cutting operation to produce formed particles. This extrusion may be effected by applying pressure in suitable extrusion equipment to the composite, such as a pressure of from about 1500 to about 13,500 pounds per square inch, sufficient to form the composite through a preheated die and then the extruded pieces are cut into suitable lengths to form catalyst particles. These catalyst particles are first dried, if necessary, at a temperature of from about 300° to about 400° F. in order that they may retain their shaped and then the dried particles are calcined further for a time of from about 0.25 to about 10 hours at a temperature of from about 850° to about 1200° F. and preferably at a temperature of from about 950° to about 1050° F.

The following examples of the preparation of catalysts comprised within the scope of this invention and the results obtained in their use for catalyzing the polymerization of propylene are characteristic, although the exact details set forth in these examples are not to be construed as imposing undue limitations upon the generally broad scope of the invention.

EXAMPLE I 73.1% $H_3PO_4$, 13.45% lampblack, 13.45% diatomaceous earth (volatile matter-free basis), extruded, 5 x 5 mm.

A mixture of 22.3 grams of diatomaceous earth (9.6% volatile matter) and 20.2 grams of lampblack was prepared in a ball mill and then intimately mixed with 127.9 grams of phosphoric acid (85.7% $H_3PO_4$). The thick paste was heated on a water bath under a heat lamp to give an apparently dry powder which was extruded on a specially designed hydraulic press. Failure to extrude at a load of 20,000 pounds was overcome by working the mass exposed to air with a pestle after which it was extruded at an initial load of 13,500 pounds and a working load varying from 8,750 to 14,000 pounds. The strands were cut, dried at 392° F. for one hour and calcined in a slow nitrogen stream in a block furnace as follows: (ABD=apparent bulk density).

| No. | Calcination | | ABD, g./cc. | Crushing strength, lbs. |
|---|---|---|---|---|
| | Temp., °F. | Time, hours | | |
| 1 | 950 | 1 | 0.827 | 20.4+ |
| 2 | 1,040 | 1 | 0.835 | 23.8+ |

73.1% $H_3PO_4$, 13.45% activated carbon, 13.45% diatomaceous earth (volatile matter-free basis), extruded, 5 x 5 mm.

These catalysts were prepared according to the procedure described for catalysts 1 and 2 from a mixture of 22.3 grams of diatomaceous earth (9.6% volatile matter), 20.2 grams of activated carbon (ground to pass 100 mesh), and 127.9 grams of phosphoric acid (85.7% $H_3PO_4$). The dried mixture extruded on the first trial on the hydraulic press extruder at an initial load of 20,000 pounds, working load of 8,000 to 10,000 pounds. After an initial drying for one hour at 392° F. the pills were calcined in a slow nitrogen stream in a block furnace as follows:

| No. | Calcination | | ABD, g./cc. | Crushing strength, lbs. |
|---|---|---|---|---|
| | Temp., °F. | Time, hours | | |
| 3 | 950 | 1 | 0.790 | 24.7+ |
| 4 | 1,040 | 1 | 0.805 | 20.6+ |

73.1% $H_3PO_4$, 13.45% petroleum coke, 13.45% diatomaceous earth (volatile matter-free basis), extruded, 5 x 5 mm.

These catalysts were prepared according to the procedure described for catalysts 1 and 2 from a mixture of 22.3 grams of diatomaceous earth (9.6% volatile matter), 20.2 grams of petroleum coke (ground to pass 100 mesh), and 127.9 grams of phosphoric acid (85.7% $H_3PO_4$). The dried mixture extruded at an initial load of 20,000 pounds, working load of 10,000 to 12,500 pounds. After an initial drying for one hour at 392° F. the pills were calcined in a slow nitrogen stream in a block furnace as follows:

| No. | Calcination | | ABD, g./cc. | Crushing strength, lbs. |
|---|---|---|---|---|
| | Temp., °F. | Time, hours | | |
| 5 | 950 | 1 | 0.803 | 22.4+ |
| 6 | 1,040 | 1 | 0.808 | 21.1+ |

73.1% H$_3$PO$_4$, 13.45% metallurgical coke, 13.45% diatomaceous earth (volatile matter-free basis), extruded, 5 x 5 mm.

These catalysts were prepared according to the procedure described for catalysts 1 and 2 from a mixture of 22.3 grams of diatomaceous earth (9.6% volatile matter), 20.2 grams of coke (ground to pass 100 mesh), and 127.9 grams of phosphoric acid (85.7% H$_3$PO$_4$). The dried mixture extruded at an initial load of 18,500 pounds, working load of 7,500 to 12,000 pounds. After an initial drying for one hour at 392° F. the pills were calcined in a slow stream of nitrogen in a block furnace as follows:

| No. | Calcination | | ABD, g./cc. | Crushing strength, lbs. |
|---|---|---|---|---|
| | Temp., °F. | Time, hours | | |
| 7 | 950 | 1 | 0.823 | 24.9+ |
| 8 | 1,040 | 1 | 0.823 | 26.3+ |

73.1% H$_3$PO$_4$, 13.45% wood charcoal, 13.45% diatomaceous earth (volatile matter-free basis), extruded, 5 x 5 mm.

These catalysts were prepared according to the procedure described for catalysts 1 and 2 from a mixture of 22.3 grams of diatomaceous earth (9.6% volatile matter), 20.2 grams of wood charcoal (screened to pass 100 mesh), and 128.0 grams of phosphoric acid (85.7% H$_3$PO$_4$). The dried mixture extruded on first trial at an initial load of 2,750 pounds, working load varying in the range of 2,000 to 2,750 pounds. Calcination of the pills after preliminary drying for one hour at 392° F. was carried out in a slow nitrogen stream in a block furnace as follows:

| No. | Calcination | | ABD, g./cc. | Crushing strength, lbs. |
|---|---|---|---|---|
| | Temp., °F. | Time, hours | | |
| 9 | 950 | 0.83 | 0.678 | 24.4+ |
| 10 | 1,040 | 1.0 | 0.679 | 26.6+ |

73.1% H$_3$PO$_4$, 13.45% graphite, 13.45% diatomaceous earth (volatile matter-free basis), extruded, 5 x 5 mm.

These catalysts were prepared according to the procedure described for catalysts 1 and 2 from a mixture of 22.3 grams of diatomaceous earth (9.6% volatile matter), 20.2 grams of graphite powder, and 127.9 grams of phosphoric acid (85.7% H$_3$PO$_4$). The dried mixture extruded on first trial at an initial load of 2,250 pounds, working load of 2,000 to 2,250 pounds. The pills were dried first for one hour at 392° F., then calcined in a slow nitrogen stream in a block furnace as follows:

| No. | Calcination | | ABD, g./cc. | Crushing strength, lbs. |
|---|---|---|---|---|
| | Temp., °F. | Time, hours | | |
| 11 | 950 | 1 | 0.755 | 25.8+ |
| 12 | 1,040 | 1 | 0.726 | 26.5+ |

The catalysts prepared as indicated above were then subjected to a polymerization activity test using a mixture of 53.3 mole per cent propylene in propane. In this test, 10 grams of the pelleted catalysts and 100 grams of the propane-propylene mixture were placed in a rotatable steel autoclave of 850 cc. capacity and heated at a temperature of 450° F. for a time of 2 hours. At the end of this time, determinations were made to indicate the percentage conversions of propylene into liquid polymers. These results on the conversion of propylene into liquid polymers by these various catalysts are given in the following table which also summarizes the crushing strengths of these catalysts before and after use.

Table I

CATALYSTS FROM BLENDS OF DIATOMACEOUS EARTH AND CARBONACEOUS MATERIALS COMPOSITED WITH ORTHOPHOSPHORIC ACID

[Test conditions: 10 grams pills, 100 grams C$_3$ feed (53.3 mole percent C$_3$H$_6$) 2 hours at 450° F. (232° C.) in 850 cc. rotating autoclave.]

| Number | Catalyst description* carbonaceous ingredient | Calcination | | Percent Conv. of C$_3$H$_6$ | Average Crushing strength, lbs. | |
|---|---|---|---|---|---|---|
| | | Temp., °F. | Time, hours | | Before test | After test |
| 1 | Lampblack | 950 | 1 | 71.4 | 20.4+ | 16.8 |
| 2 | do | 1,040 | 1 | 62.9 | 23.8+ | 20.1+ |
| 3 | Activated carbon | 950 | 1 | 57.0 | 24.7+ | 20.9+ |
| 4 | do | 1,040 | 1 | 50.9 | 20.6+ | 22.8+ |
| 5 | Petroleum coke | 950 | 1 | 59.9 | 22.4+ | 26.0+ |
| 6 | do | 1,040 | 1 | 69.2 | 21.1+ | 18.8 |
| 7 | Metallurgical coke | 950 | 1 | 70.5 | 24.9+ | 19.5 |
| 8 | do | 1,040 | 1 | 54.0 | 26.3+ | 22.1+ |
| 9 | Wood charcoal | 950 | 0.83 | 63.6 | 24.4+ | 25.0+ |
| 10 | do | 1,040 | 1 | 58.7 | 26.6+ | 27.0+ |
| 11 | Graphite | 950 | 1 | 69.2 | 25.8+ | 21.6+ |
| 12 | do | 1,040 | 1 | 81.1 | 26.5+ | 27.0+ |

* Catalyst composition: 73.1% H$_3$PO$_4$, 13.45% diatomaceous earth, and 13.45% of carbonaceous ingredient.

EXAMPLE II

Solid catalysts were formed from blends of equal weights of diatomaceous earth and carbonaceous material mixed with a polyphosphoric acid which was formed by heating orthophosphoric acid at a temperature sufficient to convert a substantial proportion of the orthophosphoric acid into a mixture of pyrophosphoric acid and triphosphoric acid. This procedure involves mixing the support mixture (temperature 70° F.) with the polyphosphoric acid (heated to a temperature of 340° F.) and extruding the hot mixture of phosphoric acid and carrier composite through a die previously heated to 340° F. The results obtained in propylene polymerization activity tests on such catalysts and the data on the crushing strengths both before and after use in the polymerization test are given in the following table:

Table II

PHOSPHORIC ACID CATALYSTS CONTAINING BLENDS OF DIATOMACEOUS EARTH AND CARBONACEOUS MATERIALS AS SUPPORTS

[Test conditions: 10 grams pills, 100 grams C$_3$ feed (53.5 mole percent C$_3$H$_6$) 2 hours at 450° F. (232° C.) in 850 cc. rotating autoclave.]

| No. | Catalyst Description[a][b] Carbonaceous Ingredient | Calcn.[c] Temp., °F. | Percent Conv. of C$_3$H$_6$ | Average Crushing Strength, pounds | |
|---|---|---|---|---|---|
| | | | | Before Test | After Test |
| 13 | Cocoanut charcoal | 950 | 92.2 | 26.2+ | 26.6+ |
| 14 | do | 1,040 | 85.5 | 24.4+ | 21.9+ |
| 15 | Lampblack | 950 | 86.5 | 27+ | 27+ |
| 16 | do | 1,040 | 89.7 | 27+ | 20.3 |
| 17 | Graphite | 950 | 85.7 | 27+ | 27+ |
| 18 | do | 1,040 | 90.0 | 26.5+ | 12.9 |
| 19 | Metallurgical Coke | 950 | 86.1 | 26.4+ | 20.8+ |
| 20 | do | 1,040 | 87.0 | 26.2+ | 17.6 |
| 21 | Petroleum coke | 950 | 70.4 | 22.2+ | 21.2+ |
| 22 | do | 1,040 | 84.0 | 17.7 | 12.5 |
| 23 | Soft Coal | 950 | 83.4 | 21.9+ | 25.0+ |
| 24 | do | 1,040 | 90.7 | 22.4+ | 13.8 |
| 25 | Wood charcoal | 950 | 88.7 | 26.3+ | 27+ |
| 26 | do | 1,040 | 86.3 | 25.2+ | 25.7+ |
| 27 | Activated carbon | 950 | 84.0 | 27+ | 27+ |
| 28 | do | 1,040 | 60.0 | 25.5+ | 14.3 |

[a] Catalyst composition: 71.2% polyphosphoric acid, 14.4% diatomaceous earth and 14.4% carbonaceous ingredient.
[b] Extruded 5 mm.
[c] One hour in a stream of N$_2$.

In general, this method of producing the catalyst gave a definite improvement in the propylene conversion and the crushing strengths after use over similar results obtained on the catalyst shown in Example I. With exception of one 60 and one 70% conversion, all the others are not less than 83% and the highest is 92%. These conversions are in most cases 15 to 33% higher and only in a few cases not less than 9% higher than those previously obtained. More catalysts in the present of load added to this equipment. The quantities of polyphosphoric acid and carriers, that is, diatomaceous earth and metallurgical coke, used in the preparation of these different catalyst mixtures as well as the density and crushing strength properties of these catalysts are given in Table III.

Table III

PHOSPHORIC ACID CATALYSTS SUPPORTED ON BLENDS OF DIATOMACEOUS EARTH AND METALLURGICAL COKE

[Test conditions: 10 grams pills, 100 grams C₃ feed (49.2% C₃H₆), 2 hours, at 450° F. (232° C.) in 850 cc. rotating autoclave.]

| No. | Catalyst Description P. P. A.[d] Free Basis | | | Calc.[b] Temp., °F. | ABD, g./cc. | Percent $C_3H_6$ Conv. | Average Crushing Strength, lbs. | |
|---|---|---|---|---|---|---|---|---|
| | Wt. Percent P. P. A.[d] | Wt. Percent Coke | Wt. Percent Diatomaceous Earth | | | | Before Test | After Test |
| 29 | 60 | 75 | 25 | 860 | 0.859 | 59.8 | 26.4+ | 26.0+ |
| 30 | 60 | 50 | 50 | 860 | 0.798 | 40.3 | 27+ | 27+ |
| 31 | 60 | 25 | 75 | 860 | 0.726 | 41.9 | 26.5+ | 27+ |
| 32 | 60 | 75 | 25 | 950 | 0.862 | 71.8 | 27+ | 27+ |
| 33 | 60 | 50 | 50 | 950 | 0.812 | 41.4 | 27+ | 27+ |
| 34 | 60 | 25 | 75 | 950 | 0.738 | 33.3 | 27+ | 27+ |
| 35 | 70 | 75 | 25 | 860 | 0.860 | 85.9 | 19.5 | 7.5 |
| 36 | 70 | 50 | 50 | 860 | 0.827 | 71.8 | 26.8+ | 26.8 |
| 37 | 70 | 25 | 75 | 860 | 0.773 | 48.2 | 27+ | 27+ |
| 38 | 70 | 75 | 25 | 950 | 0.893 | 83.9 | 24.3+ | 24.8+ |
| 39 | 70 | 50 | 50 | 950 | 0.840 | 84.8 | 27+ | 27+ |
| 40 | 70 | 25 | 75 | 950 | 0.795 | 58.8 | 26.8+ | 27+ |
| 41 | 80 | 75 | 25 | (a) | | | | |
| 42 | 80 | 50 | 50 | 860 | 0.925 | 92.3 | 18.4 | 8.0 |
| 43 | 80 | 25 | 75 | 860 | 0.853 | 77.0 | 21.1+ | 17.7 |
| 44 | 80 | 75 | 25 | (a) | | | | |
| 45 | 80 | 50 | 50 | 950 | 0.910 | 81.9 | 23.7+ | 25.9+ |
| 46 | 80 | 25 | 75 | 950 | 0.880 | 83.6 | 24.5 | 27+ |
| 47 | 70 | 50 | 50 | °680 | 0.859 | 57.8 | 25.7+ | 22.8 |
| 48 | 70 | 50 | 50 | 1,040 | 0.849 | 82.7 | 26.7+ | 27+ | a Pills failed to retain their form during trial calcinations.
b One hour in N₂ unless otherwise stated.
c 1.5 hours in air in muffle furnace.
d Polyphosphoric acid, 84.9% total P₂O₅.

series have crushing strengths after use above 25 pounds than formerly; in a few of the cases where the crushing strengths after use in the present series were less than before, they were still 18 pounds or better, but in a few other cases the strength of the used pills was considerably lower (13 lbs.) than before (19 to 27 pounds). Whereas increases in calcination temperature improved the structural stability after use of the former series, the reverse is true of the present series. The foregoing data emphasize the fact that changes in preparation technique affect the quality of the final catalyst; that superior catalysts are obtained when part of the diatomaceous earth is replaced by a large variety of carbonaceous materials, many of which are relatively cheap.

EXAMPLE III

In continuing the work referred to in Examples I and II, a systematic study of the effect of varying the acid content and the relative amounts of the two solid carriers on the activity and strength of the resultant catalyst was investigated. Cheapness of the carbonaceous material resulted in selecting metallurgical coke and wood charcoal for these further investigations. The data obtained on catalyst composites containing metallurgical coke are referred to further in this example while the other results on the catalyst containing wood charcoal are set forth in Example IV.

Catalyst composites containing 60, 70, and 80% by weight of polyphosphoric acid were prepared. In each case, blends of 3:1, 1:1, and 1:3 of metallurgical coke and diatomaceous earth were used as supports for the polyphosphoric acid. The required amounts of powdered diatomaceous earth and metallurgical coke which had passed through a 100 mesh screen were mixed and then the mixture of diatomaceous earth and coke needed for a particular catalyst preparation was dumped all at once into the calculated quantity of polyphosphoric acid (84.9% by weight total P₂O₅ content) maintained at a temperature of 340° F. and the powdered carrier and polyphosphoric acid were mixed intimately. The intimate mixture was heated at 340° F. for 0.5 hour and then extruded on the hydraulic press extrusion equipment through a die that had been heated to 340° F. The extrusion pressure to start the extrusion and to maintain it could be measured by means of the amount The results given in the above table concerning catalyst activities may be summarized in terms of the propylene converted, as follows:

(a) At any given calcination temperature and coke-diatomaceous earth ratio, conversion increases as acid concentration increases.

(b) At the 860° F. calcination temperature the activity of the catalyst containing 60% of the acid remains constant (and low) up to 50 parts coke and rises to 50% at 75 parts coke. On the other hand, though the activtity of the catalyst containing 70% of acid is about the same as that of the catalyst containing only 60% of acid at 25 parts coke, it rises rapidly to 72 and 86% as the amount of coke increases, while the catalyst containing 80% of acid starts out with a 77% activity even when the coke is very low and rises to 92% at 50 parts coke.

(c) At the 950° F. calcination temperature, as before, the catalyst containing 60% of acid shows very little change in the low activity over the 25 to 50 parts coke range, but increases to 72% at 75 parts coke. Though the activity of the catalyst containing 70% of acid rises from 59 to 85% over the 25 to 50 parts coke interval, there is no further change with further increase in coke. The catalyst containing 80% of acid shows practically no change in its high activity (84 to 82%) as coke increases.

The crushing strengths of the catalysts after use in polymerization of propylene are summarized as follows:

(a) At the 860° F. calcination temperature crushing strengths after use are very poor when the catalyst contains 80% of acid and either 25 or 50 parts of coke, or when the catalyst contains 70% of acid and 75 parts coke. Otherwise, the crushing strengths are very good (above 26 lbs.).

(b) At the 950° F. calcination temperature the crushing strengths after use are very good (above 25 lbs.) at all acid and coke concentrations tested.

From the above indicated results, it may be concluded that:

(a) Catalysts that possess very good crushing strengths after use and are very active can be obtained at any polyphosphoric acid level within the 60 to 80% range providing the right calcination temperature and coke-diatomaceous earth ratio is selected.

(b) At the same calcination temperature for the same activity, lower acid content can be compensated by increase in the amount of coke.

(c) In general, a 950° F. calcination produces a more satisfactory catalyst than an 860° F. calcination.

(d) Though at the 860° F. calcination temperature only the catalyst consisting of 70% acid and 30% of a 1:1 mixture of coke and diatomaceous earth represents a very good combination of activity and crushing strength after use, at the 950° F. calcination temperature, with one exception, all catalysts containing 70 and 80% of acid possess high activities and high crushing strengths after use, whereas in the 60% acid series only the catalyst with a 3:1 support of coke and diatomaceous earth had a comparable activity and after use crushing strength.

EXAMPLE IV

A series of solid catalysts was prepared by compositing polyphosphoric acid with a mixture of wood charcoal and diatmaceous earth. Sufficient polyphosphoric acid was supported on a 1:3, 1:1, and a 3:1 blend of wood charcoal and diatomaceous earth so that 60, 70, and 80% of the composite was the polyphosphoric acid having a total $P_2O_5$ content of 84.9% by analysis. These nine catalyst mixtures were extruded on a hydraulic press through a 5 mm. die that had been heated to 340° F. just prior to use in the extrusion. With the exception of the catalysts consisting of 80% polyphosphoric acid and 20% of a 3:1 blend of wood charcoal and diatomaceous earth, one-half of the pellets of each of the other eight compositions was calcined at 860° F. while the other half was calcined at 950° F. The catalyst pellets were finally evaluated for polymerizing activity in the usual way in a rotating steel autoclave by means of a propane-propylene mixture. The results obtained in these propylene polymerizing activity tests are given in Table IV.

2. Of the catalysts studied in the 70% acid series only those whose supports consist of 50-50 and 75-25 blends of charcoal and diatomaceous earth show very good propylene conversions (69 to 78%). The activities of these catalysts are affected a little by the calcination temperatures employed (860° and 950° F.).

3. In the 80% acid series the catalysts that contain supports consisting of 25-75 and 50-50 blends of charcoal and diatomaceous earth have very good activities (71 to 82%). As in the 70% acid series above the calcination temperatures (180° and 950° F.) have hardly any effect on the activities of the catalysts.

4. The activity curves of the catalysts calcined at 950° F. illustrate the tendency toward a very small increase or no increase at all in percent propylene conversion as the charcoal in the charcoal-diatomaceous earth support increases beyond 50%. The slopes of the curves representing the 70 and 80% acid catalyst series calcined at 860° F. exhibit a similar, though much less pronounced, tendency.

Similarly, the crushing strength of these catalysts after use in the propylene polymerization tests, is indicated by Figure 2, which shows that:

1. The catalysts that contained an acid concentration of 60% and that were calcined at either 860° or 950° F. showed almost no change in the excellent crushing strength after use (27 lbs.) as the ratio of the charcoal and diatomaceous earth in the support was varied from 1:3 through 1:1 to 3:1.

2. The same is also true of three catalysts in the 70% acid series that were calcined at 950° F. However, the catalysts in a similar series calcined at 860° F. showed the 27 lbs. crushing strength after use only when the charcoal-diatomaceous earth ratios of the supports were 1:3 and 1:1. Further increase in the charcoal content resulted in serious deterioration of strength.

3. In the 80% acid catalyst series at either calcination

*Table IV*

POLYPHOSPHORIC ACID-WOOD CHARCOAL-DIATOMACEOUS EARTH CATALYSTS

[Test conditions: 10 grams pills, 100 grams $C_3$ feed (49.2 mole percent $C_3H_6$), 2 hours at 450° F. (232° C.) in 850 cc. rotating autoclave.]

| No. | Catalyst Description P. P. A.ᵃ Free Basis | | | Calc.ᵇ Temp., °F. | ABD, g/cc. | Percent Conv. $C_3H_6$ | Crushing Strength, lbs. | |
|---|---|---|---|---|---|---|---|---|
| | Percent P.P.A.ᵃ | Percent Wood Charcoal | Percent Diatomaceous earth | | | | Before Test | After Test |
| 49 | 60 | 75 | 25 | 860 | 0.792 | 46.7 | 27.0+ | 27+ |
| 50 | 60 | 50 | 50 | 860 | 0.762 | 31.1 | 27.0+ | 26.9+ |
| 51 | 60 | 25 | 75 | 860 | 0.807 | 23.0 | 27.0+ | 26.7+ |
| 52 | 70 | 75 | 25 | 860 | 0.846 | 78.1 | 21.6+ | ᵉ15.6 |
| 53 | 70 | 50 | 50 | 860 | 0.812 | 69.1 | 27.0+ | 27.0+ |
| 54 | 70 | 25 | 75 | 860 | 0.802 | 48.2 | 27.0+ | 27+ |
| 55 | 80 | 75 | 25 | (ᵈ) | | | | |
| 56 | 80 | 50 | 50 | 860 | 0.846 | 82.3 | 19.9 | ᵉ8.9 |
| 57 | 80 | 25 | 75 | 860 | 0.984 | 70.7 | 23.0+ | 21.5 |
| 58 | 60 | 75 | 25 | 950 | 0.766 | 45.7 | 27.0+ | 27+ |
| 59 | 60 | 50 | 50 | 950 | 0.728 | 38.3 | 27.0+ | 25.1+ |
| 60 | 60 | 25 | 75 | 950 | 0.768 | 14.0 | 26.7+ | 27+ |
| 61 | 70 | 75 | 25 | 950 | 0.917 | 68.6 | 26.6+ | 26.7+ |
| 62 | 70 | 50 | 50 | 950 | 0.798 | 71.7 | 27.0+ | 27+ |
| 63 | 70 | 25 | 75 | 950 | 0.802 | 36.1 | 26.6+ | 26.9+ |
| 64 | 80 | 75 | 25 | ᶜ950 | | | | |
| 65 | 80 | 50 | 50 | 950 | 0.935 | 75.1 | 27.0+ | ᵉ7.0 |
| 66 | 80 | 25 | 75 | 950 | 0.992 | 71.7 | 26.2+ | 25.2 |
| 67 | 70 | 50 | 50 | ᶠ680 | 0.810 | 55.5 | 25.9+ | 22.1+ |
| 68 | 70 | 50 | 50 | 1,040 | 0.779 | 72.6 | 27.0+ | 27+ |

ᵃ Polyphosphoric acid containing 84.9% $P_2O_5$.
ᵇ One hour in a slow stream of $N_2$, unless otherwise stated.
ᶜ With the exception of a few hard pills, the others were so soft that they became compacted into one mass during attempts to remove them from the calcination tube.
ᵈ After the experience with the calcination at 950° F. no calcination at 860° F. was tried.
ᵉ Softening point rather than true peripheral crushing strength.
ᶠ One and a half hours in air.

The data given in Table IV may be expressed in the form of smooth curves. The polymerization activities of the catalysts may be expressed by the curves given in Figure 1, as follows:

1. Though increasing the amount of charcoal from 25 to 75 parts in the charcoal-diatomaceous earth supports of the catalysts containing an acid concentration of 60% improved their activity considerably, the best propylene conversion was low (less than 50%) regardless of the calcination temperature used (860° or 950° F.).

temperature the crushing strength after use was satisfactory (over 21 lbs.) only when the charcoal-diatomaceous earth ratio of the support was 1:3. The after use crushing strength dropped below 10 lbs. when the charcoal content of the support was increased to 50%, while pills of a catalyst that contains 75% charcoal in the support even failed to harden satisfactorily during calcination.

The metallurgical coke and wood charcoal referred to in Examples III and IV also contained certain amounts of inorganic materials which appear as ash when the coke or wood charcoal is burned. (Ash contents: coke, 10.6% by weight; wood charcoal, 5.0%.) Emission spectral analysis of the ash of the metallurgical coke and charcoal upon the basis of the total carbonaceous material is given in Table V.

*Table V*
METALLIC CONTENT OF METALLURGICAL COKE AND CHARCOAL ASHES

| Metal | Weight percent in— | |
|---|---|---|
| | Metallurgical Coke | Wood Charcoal |
| Fe | 0.6 | 0.005 |
| Mn | 0.01 | 0.20 |
| Cr | | |
| Ni | 0.01 | |
| V | 0.01 | |
| Pb | 0.01 | 0.005 |
| Sn | | |
| Cu | 0.02 | 0.02 |
| Zn | | |
| Ti | 0.1 | 0.005 |
| Al | >1.6 | 0.08 |
| Mg | 0.4 | 0.15 |
| Ca | 0.8 | >0.75 |
| Na | 0.4 | 0.04 |
| Zr | | |
| Si | (¹) | (¹) |
| K | | |
| Ag | | |
| Pt | | |
| Mo | | |
| Co | | |

¹ Not determined.

The metals present in the metallurgical coke and wood charcoal probably in the form of oxides may react with portions of the phosphoric acid during the preparation of the catalyst composites and result in the formation of small amounts of metal phosphates and metal acid phosphates.

From the results given in Table IV it is noted that all of the 60% polyphosphoric acid catalysts, regardless of their charcoal content, had polymerizing activities below 50% but also possessed very good after use crushing strengths in the neighborhood of 27 lbs. Of the catalysts which contain 70% of polyphosphoric acid, only those containing 50% or more of charcoal in the solid carrier mixture had activities of 69% or better. The calcination temperature used on these catalysts seemed to have very little effect on their activities. The after use crushing strengths of these catalysts produced from the 1:1 charcoal-diatomaceous earth support were the same, namely, 27 lbs. at either calcination temperature but unless the catalyst with the 3:1 charcoal-diatomaceous earth support was calcined at 950° F. its crushing strength after use was below 27 lbs. All of the catalysts produced from 80% polyphosphoric acid had activities of 71% or more but only the catalyst produced from the 1:3 charcoal-diatomaceous earth support had good after use crushing strength, that is, higher than 21 pounds. With this catalyst composition the calcination temperature had hardly any effect on either the activities or the crushing strength after use.

We claim as our invention:

1. A process for manufacturing an improved solid catalyst which comprises mixing from about 60 to about 80 per cent by weight of an oxygen acid of phosphorus with from about 40 to about 20 per cent by weight of a solid carrier consisting of from about 1 to about 3 parts by weight of diatomaceous earth and from about 3 to about 1 parts by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

2. A process for manufacturing a solid catalyst which comprises mixing from about 65 to about 75 per cent by weight of an oxygen acid of phosphorus with from about 35 to about 25 per cent by weight of a solid carrier consisting of from about 1 to about 3 parts by weight of diatomaceous earth and from about 3 to about 1 parts by weight of a solid carbonaceous material selected from the members of the group consisting of lampblack, graphite, charcoal, coke and powdered coal to form a composite, shaping said composite into particles, and calcining said particles at a temperature of from about 850° to about 1200° F.

3. A process for manufacturing a solid catalyst which comprises mixing from about 65 to about 75 per cent by weight of a polyphosphoric acid with from about 35 to about 25 per cent by weight of a solid carrier consisting of from about 1 to about 3 parts by weight of diatomaceous earth and from about 3 to about 1 parts by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

4. The process defined in claim 1 further characterized in that said solid carbonaceous material comprises essentially lampblack.

5. The process defined in claim 1 further characterized in that said solid carbonaceous material comprises essentially graphite.

6. The process defined in claim 1 further characterized in that said solid carbonaceous material comprises essentially charcoal.

7. The process defined in claim 1 further characterized in that said solid carbonaceous material comprises essentially a coke.

8. The process defined in claim 1 further characterized in that said solid carbonaceous material comprises essentially powdered coal.

9. The process defined in claim 3 further characterized in that said solid carbonaceous material comprises essentially lampblack.

10. The process defined in claim 3 further characterized in that said solid carbonaceous material comprises essentially graphite.

11. The process defined in claim 3 further characterized in that said solid carbonaceous material comprises essentially a charcoal.

12. The process defined in claim 3 further characterized in that said solid carbonaceous material comprises essentially a coke.

13. The process defined in claim 3 further characterized in that said solid carbonaceous material comprises essentially a powdered coal.

14. A process for manufacturing a solid catalyst which comprises mixing from about 60 to about 80 per cent by weight of polyphosphoric acid with from about 40 to about 20 per cent by weight of a solid carrier consisting of from about 1 to about 3 parts by weight of diatomaceous earth and from about 3 to about 1 parts by weight of metallurgical coke to form a composite, shaping said composite into particles, and calcining said particles at a temperature of from about 850° to about 1200° F.

15. A process for manufacturing a solid catalyst which comprises mixing from about 60 to about 80 per cent by weight of polyphosphoric acid with from about 40 to about 20 per cent by weight of a solid carrier consisting of from about 1 to about 3 parts by weight of diatomaceous earth and from about 3 to about 1 parts by weight of wood charcoal to form a composite, shaping said composite into particles, and calcining said particles at a temperature of from about 850° to about 1200° F.

16. A process for manufacturing a solid catalyst which comprises mixing from about 60 to about 80 per cent by weight of polyphosphoric acid with from about 40 to about 20 per cent by weight of a solid carrier consisting of from about 1 to about 3 parts by weight of diatomaceous earth and from about 3 to about 1 parts by weight of metallurgical coke to form a composite, drying said composite at a temperature of from about 300° to about 400° F. for a time sufficient to form an extrudable mixture, extruding and cutting said mixture to form shaped particles, and calcining said particles at a temperature of from about 850° to about 1200° F.

17. A process for manufacturing an improved solid catalyst which comprises mixing from about 60 to about 80 per cent by weight of an oxygen acid of phosphorus with from about 40 to about 20 per cent by weight of a solid carrier consisting of from about 1 to about 3 parts by weight of a siliceous adsorbent and from about 3 to about 1 parts by weight of a solid carbonaceous material selected from the members of the group consisting of lampblack, graphite, charcoal, coke, and powdered coal to form a composite, shaping said composite into particles, and calcining said particles at a temperature of from about 850° to about 1200° F.

18. The process defined in claim 17 further characterized in that said siliceous adsorbent comprises essentially a Fuller's Earth.

19. The process defined in claim 17 further characterized in that said siliceous adsorbent comprises essentially montmorillonite.

References Cited in the file of this patent

UNITED STATES PATENTS

| Number | Name | Date |
|---|---|---|
| 2,057,433 | Ipatieff | Nov. 13, 1936 |
| 2,120,723 | Watson | June 13, 1938 |
| 2,220,693 | Van Peski | Nov. 5, 1940 |
| 2,233,144 | Pinkerton | Feb. 25, 1941 |
| 2,293,353 | Moravec | Aug. 18, 1942 |
| 2,496,621 | Deery | Feb. 17, 1950 |
| 2,525,144 | Mavity | Nov. 10, 1950 |
| 2,569,092 | Deering | Sept. 25, 1951 |